(12) United States Patent
Roberts et al.

(10) Patent No.: US 11,002,247 B2
(45) Date of Patent: May 11, 2021

(54) WIND TURBINE BLADE WITH FLATBACK ROOT SEGMENT AND RELATED METHOD

(71) Applicant: LM WIND POWER US TECHNOLOGY APS, Kolding (DK)

(72) Inventors: David Roberts, Amsterdam (NL); Allan Riber, Kolding (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 169 days.

(21) Appl. No.: 16/318,451

(22) PCT Filed: Jul. 12, 2017

(86) PCT No.: PCT/EP2017/067614
§ 371 (c)(1),
(2) Date: Jan. 17, 2019

(87) PCT Pub. No.: WO2018/015254
PCT Pub. Date: Jan. 25, 2018

(65) Prior Publication Data
US 2019/0234374 A1 Aug. 1, 2019

(30) Foreign Application Priority Data
Jul. 19, 2016 (EP) .................................. 16180109

(51) Int. Cl.
*F03D 1/06* (2006.01)
*B29C 65/00* (2006.01)
*B29L 31/08* (2006.01)

(52) U.S. Cl.
CPC ............ *F03D 1/0675* (2013.01); *B29C 66/54* (2013.01); *F03D 1/0633* (2013.01);
(Continued)

(58) Field of Classification Search
CPC ...... F03D 1/0633; F03D 1/0641; F03D 1/0683
See application file for complete search history.

(56) References Cited

U.S. PATENT DOCUMENTS 7,895,745 B2 * 3/2011 Althoff ................. F03D 1/0675
29/889.21
8,075,278 B2 * 12/2011 Zuteck .................. F03D 1/0675
416/233
(Continued)

FOREIGN PATENT DOCUMENTS

CN 101260861 A 9/2008
CN 101749194 A 6/2010
(Continued)

OTHER PUBLICATIONS

Communication Pursuant to Article 94(3) EPC dated Feb. 26, 2020 corresponding to European application No. 17736969.1-1007.
(Continued)

*Primary Examiner* — Juan G Flores
(74) *Attorney, Agent, or Firm* — Nath, Goldberg & Meyer; Jerald L. Meyer; Tanya E. Harkins

(57) ABSTRACT

A wind turbine blade and method of manufacture, the blade extending between root and tip ends on a longitudinal axis and having root, transition, and airfoil regions. The blade has a profiled contour with a chord extending between the leading and trailing edges; a blade shell with a first blade shell part with a pressure side and a second blade shell part with a suction side, the blade shell parts extending between root and tip ends and are joined on a primary glue joint; first and second main spar caps integrated in the first and the second blade shell parts, respectively, and have one or more shear webs there between. A third blade shell part may be present and joined to the first blade shell part along a first secondary glue joint and to the second blade shell part along a second secondary glue joint.

15 Claims, 6 Drawing Sheets

Figure 1:
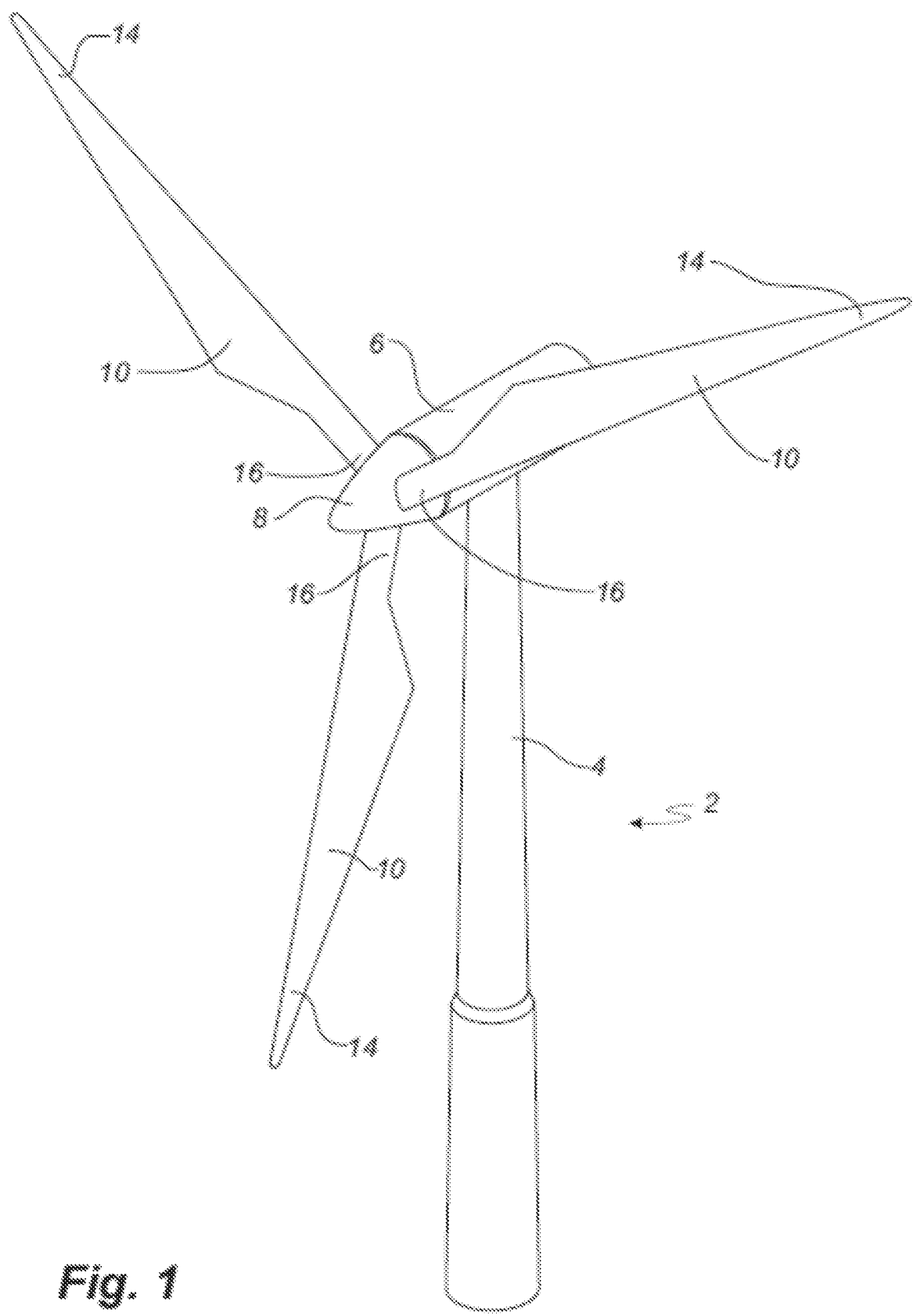

(52) U.S. Cl.
CPC . *B29L 2031/085* (2013.01); *F05B 2240/2211* (2013.01); *F05B 2240/301* (2013.01); *Y02E 10/72* (2013.01); *Y02P 70/50* (2015.11)

(56) References Cited

U.S. PATENT DOCUMENTS

| | | | | |
|---|---|---|---|---|
| 8,092,187 | B2* | 1/2012 | Bell | F03D 1/06 |
| | | | | 416/224 |
| 10,337,490 | B2* | 7/2019 | Caruso | F03D 13/10 |
| 2011/0200446 | A1* | 8/2011 | Garcia | F03D 1/0675 |
| | | | | 416/226 |
| 2011/0274552 | A1* | 11/2011 | Torrez Martinez | F03D 1/0675 |
| | | | | 416/227 A |
| 2012/0027588 | A1 | 2/2012 | Carroll | |
| 2017/0363060 | A1 | 12/2017 | Bae et al. | |

FOREIGN PATENT DOCUMENTS

| | | | |
|---|---|---|---|
| CN | 102596716 | A | 7/2012 |
| CN | 103147930 | A | 6/2013 |
| CN | 104405578 | A | 3/2015 |
| EP | 2204577 | A2 | 7/2010 |
| EP | 2341241 | A1 | 7/2011 |
| EP | 2568166 | A1 | 3/2013 |
| EP | 2998572 | A1 | 3/2016 |

OTHER PUBLICATIONS

Annex dated Feb. 26, 2020 corresponding to European application No. 17736969.1-1007.
Translation of Search Report dated Jan. 16, 2021 corresponding to Chinese application No. 201780044784.X.
Chinese Office Action dated Jan. 26, 2021 corresponding to application No. 201780044784.X.

* cited by examiner

WIND TURBINE BLADE WITH FLATBACK ROOT SEGMENT AND RELATED METHOD

This is a National Phase Application filed under 35 U.S.C. 371 as a national stage of PCT/EP2017/067614, filed Jul. 12, 2017, an application claiming the benefit of European Application No. 16180109.7, filed Jul. 19, 2016, the content of each of which is hereby incorporated by reference in its entirety.

TECHNICAL FIELD

The present disclosure pertains to the field of manufacturing wind turbine blade parts. In particular, the present disclosure relates to a blade mould for manufacturing a blade shell part of a wind turbine blade and/or a method for manufacturing a blade shell part of a wind turbine blade.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Then, the two halves are glued together, often by means of internal flange parts. Glue is applied to the inner face of the lower blade half before the upper blade half is lowered thereon. Additionally, one or two reinforcing profiles (beams) are often attached to the inside of the lower blade half prior to gluing to the upper blade half.

The aerodynamic shell parts are typically made by use of Vacuum Assisted Resin Transfer Moulding (VARTM), where a plurality of fibre mats are arranged on top of a rigid mould parts and possibly also a core material to provide parts having a sandwich structure. When the fibre mats have been stacked and overlapped so as to form the final shape of the wind turbine blade shell part, a flexible vacuum bag is arranged on top of the fibre mats and sealed against the rigid mould part, thereby forming a mould cavity containing the fibre mats. Resin inlets and vacuum outlets are connected to the mould cavity. First the mould cavity is evacuated via the vacuum outlets so as to form a negative pressure in the mould cavity, after which a supply of liquid resin is supplied via the resin inlets. The resin is forced into the mould cavity due to the pressure differential and impregnates the fibre material of the fibre mats. When the fibre material has been fully impregnated, the resin is cured in order to form the final composite structure, i.e. the blade shell part.

Wind turbine blades comprising a flatback section are known in the art and have shown to contribute to an increased AEP. However, to incorporate flatback sections in wind turbine blades has shown to be a challenging task.

SUMMARY OF THE INVENTION

Accordingly, there is a need for systems and methods that will improve the quality of wind turbine blades with flatback profile sections (or at least decrease the risk of errors occurring).

Accordingly, there is provided a wind turbine blade extending from a root end to a tip end along a longitudinal axis and comprising a root region, a transition region, and an airfoil region, the wind turbine blade comprising a profiled contour with a leading edge and a trailing edge and a chord extending between the leading edge and the trailing edge; a blade shell with a first blade shell part with a pressure side and a second blade shell part with a suction side, the first and second blade shell parts extending from the root end to the tip end and joined along a primary glue joint; a first main spar cap integrated in the first blade shell part; a second main spar cap integrated in the second blade shell part; and one or more shear webs connected between the first main spar cap and the second main spar cap. The wind turbine blade may comprise a third blade shell part extending from the root end of the wind turbine blade. The third blade shell part may be joined to the first blade shell part along a first secondary glue joint and/or to the second blade shell part along a second secondary glue joint.

Also provided is a method of manufacturing a wind turbine blade extending from a root end to a tip end along a longitudinal axis and comprising a root region, a transition region, and an airfoil region, the wind turbine blade comprising a profiled contour with a leading edge and a trailing edge and a chord extending between the leading edge and the trailing edge, a blade shell with a pressure side and a suction side, a first main spar cap integrated in the pressure side of the blade shell, a second main spar cap integrated in the suction side of the blade shell, and one or more shear webs connected between the first main spar cap and the second main spar cap. The method comprises providing a first blade shell part and a second blade shell part each extending from the root end to the tip end; optionally providing a third blade shell part; joining the first blade shell part and the second blade shell part along a primary glue joint; optionally joining the first blade shell part and the third blade shell part along a first secondary glue joint; and optionally joining the second blade shell part and the third blade shell part along a second secondary glue joint; optionally such that the third blade shell part extends from the root end of the wind turbine blade. Providing the third blade shell part optionally comprises forming a flatback section in the third blade shell part.

The disclosed wind turbine blade and method provide increased design flexibility when designing wind turbine blades with flatback sections. Further, the present disclosure allows for flatback sections near or at the root end of the wind turbine blade.

The disclosed wind turbine blade and method advantageously avoids merging two glue joints into one glue joint in a high strain region, such as the root region, of the wind turbine blade. Thus, reduced risk of errors in the root region of the wind turbine blade is provided.

Integration of a third blade shell part in the trailing edge section of the blade will avoid starting a flatback section where strains are relatively high and merging two glue joints in the trailing edge into one glue joint.

A wind turbine blade extends from a root end to a tip end along a longitudinal axis and comprises a root region, a transition region, and an airfoil region. The transition region of the wind turbine blade part comprises a shoulder defining a maximum chord of the wind turbine blade.

The method and/or systems advantageously relate to manufacture of wind turbine blades, e.g. having a blade length of at least 40 metres, or at least 45 metres, or even at least 50 metres. The wind turbine blades may be prebent so that, when mounted on an upwind configured horizontal wind turbine in a non-loaded state, they will curve forward out of the rotor plane so that the tip to tower clearance is increased. A wind turbine blade has a tip end and a root end with an inner surface and an outer surface.

The inner surface of a wind turbine blade or a blade shell part is a surface that is not exposed to the surroundings when the wind turbine blade has been assembled. The outer surface of a wind turbine blade of a blade shell part is a surface that is exposed to the surroundings when the wind turbine blade has been assembled.

The wind turbine blade comprises a profiled contour with a leading edge and a trailing edge and a chord extending between the leading edge and the trailing edge.

The wind turbine blade has a blade shell and comprises a first blade shell part with a pressure side and a second blade shell part with a suction side, the first and second blade shell parts extending from the root end to the tip end and joined along a primary glue joint. The primary glue joint may be at the leading edge. The blade shell comprises a first main spar cap integrated in the first blade shell part; a second main spar cap integrated in the second blade shell part; and one or more shear webs, such as a primary shear web and/or a secondary shear web. The one or more shear webs are optionally connected between the first main spar cap and the second main spar cap.

The wind turbine blade may comprise a third blade shell part optionally extending from the root end and/or the root region of the wind turbine blade. The third blade shell part may be joined to the first blade shell part along a first secondary glue joint and/or to the second blade shell part along a second secondary glue joint. The third blade shell part may extend into the transition region and/or into the airfoil region. The third blade shell part may form at least a part of the trailing edge of the wind turbine blade. The third blade shell part may form at least 1% of the circumference of the wind turbine blade shell at the root end, such as at least 5%, such as at least 10%, such as at least 15%, or such as at least 20% of the circumference of the wind turbine blade shell at the root end.

The first blade shell part and the second blade shell part may be joined along a secondary glue joint. The first secondary glue joint and the second secondary glue joint may merge into the secondary glue joint at a merging distance from the root end. The merging distance may be in the range from 0.2*L to 0.8*L, where L is the blade length of the wind turbine blade.

The outer surface of the shell part may at least in a first cross section perpendicular to the longitudinal axis, such as at the root end or a distance from the root end, form a straight line segment and/or a concave line segment, e.g. forming a flatback section at the trailing edge. The straight line segment may have a length of at least 0.3*t, where t is the maximum thickness of the wind turbine blade in the respective cross-section.

The blade shell, such as the third blade shell part, may comprise a flatback section or at least part thereof at the trailing edge, the flatback section extending from a first flatback distance from the root end along the longitudinal axis to a second flatback distance from the root end. Thus the flatback section starts at the first flatback distance and ends at the second flatback distance. The first flatback distance may be less than 3 m, such as in the range from 1 m to 2.5 m. In one or more exemplary wind turbine blades, the first flatback distance is in the range from 1 m to 2 m, e.g. about 1.5 m or about 1.7 m. In one or more exemplary wind turbine blades, the first flatback distance may be less than 1 m. In one or more exemplary wind turbine blades, the first flatback distance may be 0 m. The second flatback distance may be larger than 0.3*, such as larger than 0.4*L, where L is the blade length of the wind turbine blade. In one or more exemplary wind turbine blades, the second flatback distance may be larger than 0.5*L, where L is the blade length of the wind turbine blade.

The flatback section may have a length in the range from 0.01*L to 0.70*L, where L is the blade length of the wind turbine blade.

The flatback section or at least part(s) thereof may have a maximum height in the range from 0.30*t to t, where t is the thickness of the wind turbine blade. The flatback section may, at a first distance in the range from 1 to 2 meters from the root end, have a height larger than 0.5*t. The flatback section may, at a second distance in the range from 2 to 3 meters from the root end, have a height larger than 0.7*t.

The first secondary glue joint may be arranged between the trailing edge and the first main spar cap. The second secondary glue joint may be arranged between the trailing edge and the second main spar cap.

A reference axis may, e.g. in the root region of the wind turbine blade and/or in the transition region of the wind turbine blade, be an axis perpendicular to the pitch axis and crossing the leading edge and the pitch axis.

A first axis crosses the first secondary glue joint and is perpendicular to the longitudinal axis and/or the pitch axis of the wind turbine blade. The first axis may, e.g. in the root region or at a distance less than 5 m from the root end, cross the pitch axis of the wind turbine blade.

A second axis crosses the second secondary glue joint and is perpendicular to the longitudinal axis and/or the pitch axis of the wind turbine blade. The second axis may, e.g. in the root region or at a distance less than 5 m from the root end, cross the pitch axis of the wind turbine blade.

A first angle also denoted V1 between the first axis and the reference axis may be larger than 15 degrees, e.g. at least at a first distance and/or a second distance from the root end along the longitudinal axis. The first angle V1 may, at least at a distance of 2 m, 3 m or 6.5 m from the root end, be larger than 40 degrees, such as larger than 50 degrees. The first angle V1 may, at least at a distance less than 2 m from the root end, such as at the root end, be larger than 30 degrees, such as larger than 50 degrees. In one or more exemplary wind turbine blades, the first angle is, e.g. at a first distance and/or a second distance from the root end along the longitudinal axis, in the range from 30 degrees to 80 degrees.

A second angle also denoted V2 between the reference axis and the second axis may be larger than 0 degrees, e.g. at least at a first distance and/or a second distance from the root end along the longitudinal axis. The second angle V2 may, at least at a distance of 6.5 m from the root end, be larger than 0 degrees.

In one or more exemplary wind turbine blades, the second angle is, e.g. at a first distance and/or a second distance from the root end along the longitudinal axis, in the range from 0 degrees to 10 degrees.

In one or more exemplary wind turbine blades, an angle also denoted V3 between the first axis and the second axis may, e.g. at a first distance and/or a second distance from the root end along the longitudinal axis, be larger than 20 degrees.

The angle V3 between the first axis and the second axis may, at least at a distance of 2 m, 3 m or 6.5 m from the root end, be larger than 40 degrees, such as larger than 50 degrees. The angle V3 between the first axis and the second axis may, at least at a distance of 2 m and/or 3 m from the root end, be larger than 50 degrees, e.g. in the range from 60 degrees to 70 degrees.

The angle V3 may, e.g. at a distance less than 2 m from the root end, such as at the root end, be larger than 30 degrees, such as larger than 50 degrees.

Table 1 shows features of cross-sections C0, C1, . . . , C8 of exemplary wind turbine blades according to the invention. In Table 1, $D_{root}$ is the distance of the cross-section to the root end, LS is the length of straight line segment, V1 is the first angle, V2 is the second angle and V3 is the angle between the first axis and the second axis.

TABLE 1

Cross-sections of exemplary wind turbine blades

| | C0 | C1 | C2 | C3 | C4 | C5 | C6 | C7 | C8 |
|---|---|---|---|---|---|---|---|---|---|
| $D_{root}$ | 0 | 0.01 * L | 1 m | 2 m | 3 m | 0.1 * L | 0.2 * L | 0.3 * L | 0.4 * L |
| LS | 0 to 0.3 * t | 0 to 0.3 * t | 0 to 0.3 * t | >0.4 * t or >1m | >0.4 * t or >1m | >0.4 * t or >1m | >0.5 * t or >0.5m | >0.5 * t or >0.1m | 0 to 0.5m |
| V1 | >15° | >15° | >15° | >30° or ≥50° | >30° or ≥50° | >30° | 0° to 30° | 0° to 30° | 0° to 30° |
| V2 | ≥0° | ≥0° | ≥0° | ≥0° | ≥0° | >0° | 0° to 30° | 0° to 30° | 0° to 30° |
| V3 | >15° | >15° | >15° | ≥30° or ≥50° | ≥30° or ≥50° | ≥30° | 10° to 30° | 0 to 10° | 0 to 10° |

Table 2 shows features of exemplary wind turbine blades B1, . . . , B4 according to the invention. In Table 2, D1 is the first flatback distance, D2 is the second flatback distance, LF is the length of the flatback section.

TABLE 2

Exemplary wind turbine blades

| | B1 | B2 | B3 | B4 |
|---|---|---|---|---|
| D1 | <2 m | <2 m | <3 m | <3 m |
| D2 | >0.2*L | >0.4*L | >0.3*L | >0.3*L |
| LF | >0.2*L | >0.4*L | >0.3*L | >0.3*L |
| Cross-sections of blade | C3 | C0, C1, C2, C3, C4, C5, C6, C7, C8 | C3, C4, C5 | C1, C2, C3 |

The disclosed method may be used for manufacture of a wind turbine blade as described herein. Features described in relation to the wind turbine blade may also appear in the method and/or vice versa.

DETAILED DESCRIPTION

Figure 2:
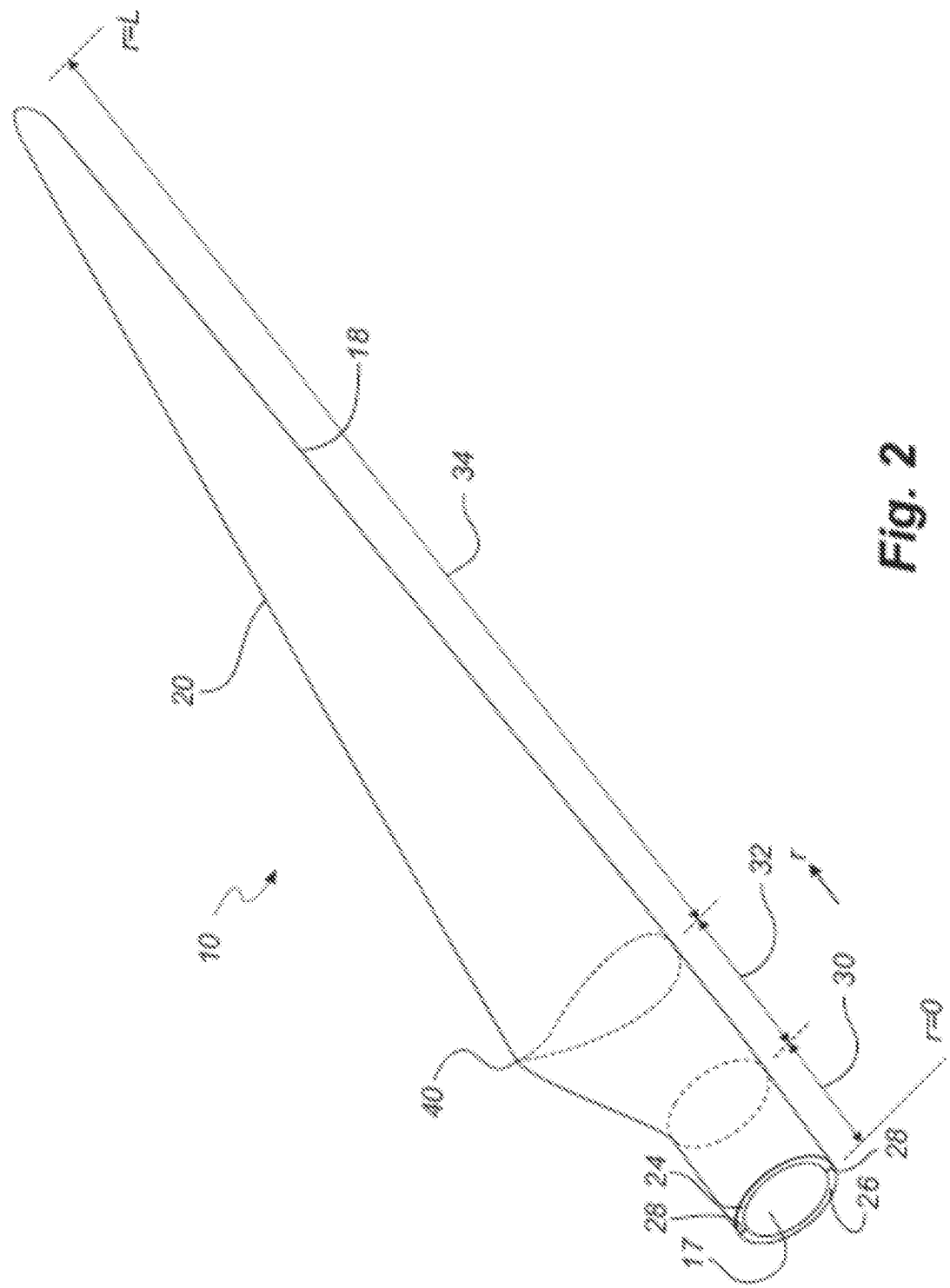
Figure 3:
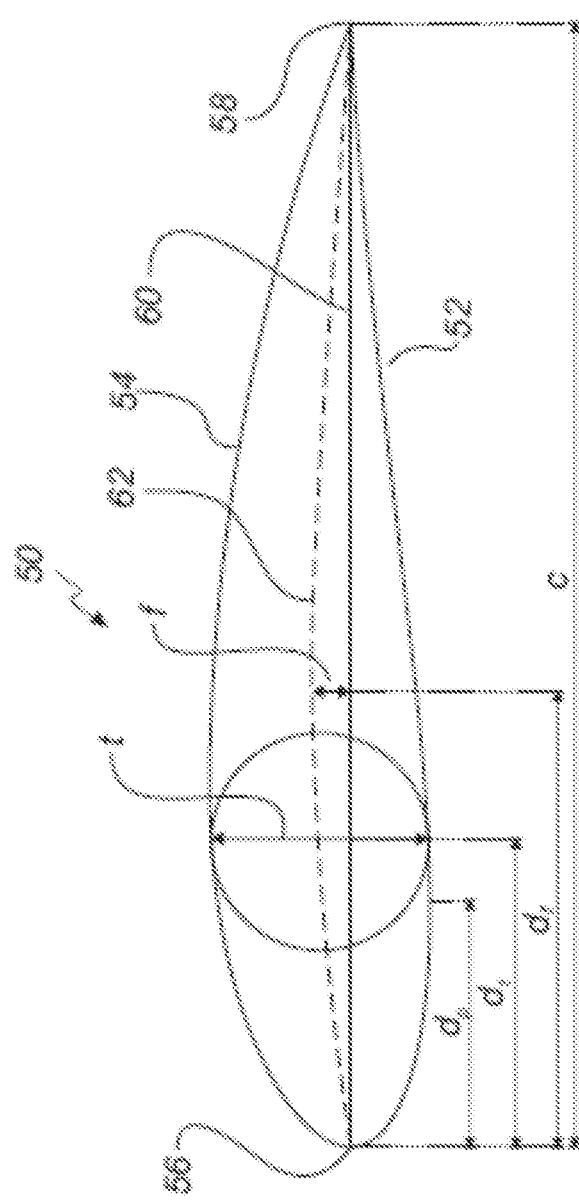
Figure 4:
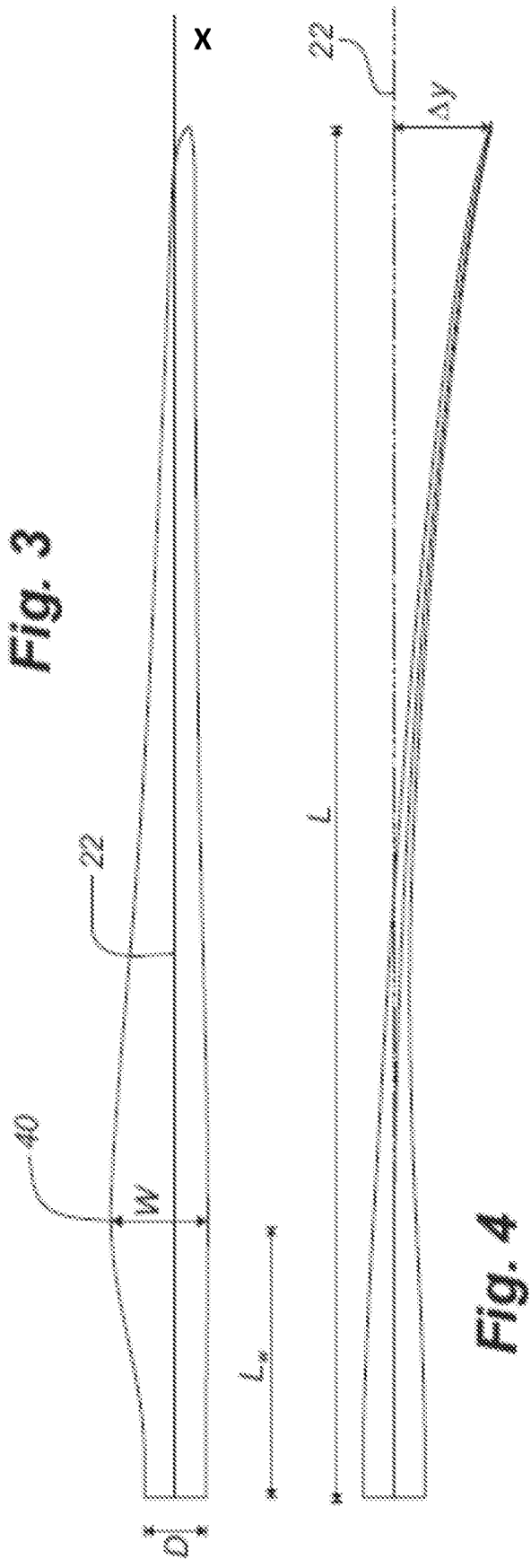
Figure 5:
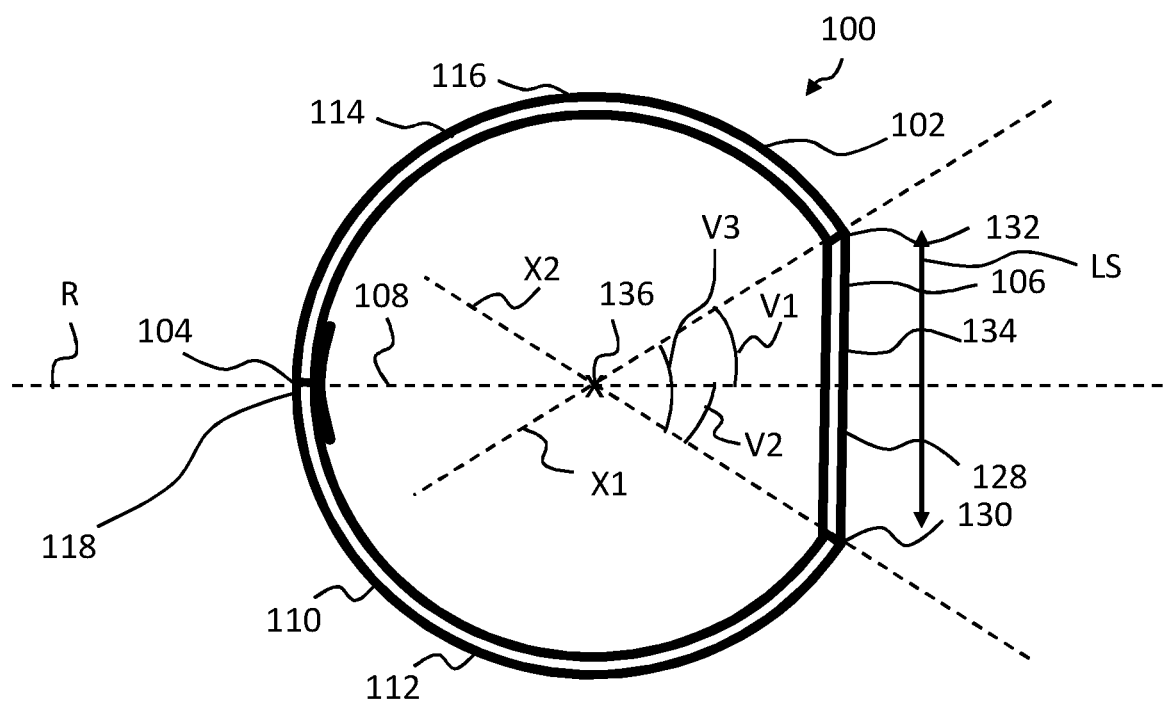
Figure 6:
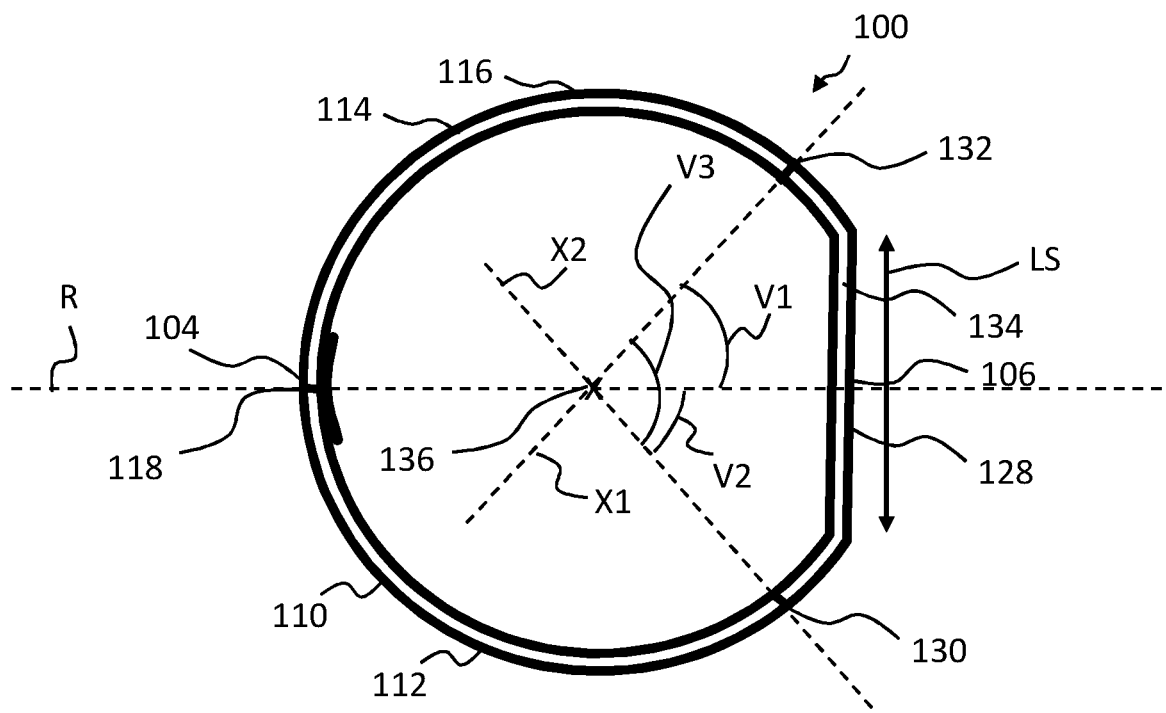
Figure 7:
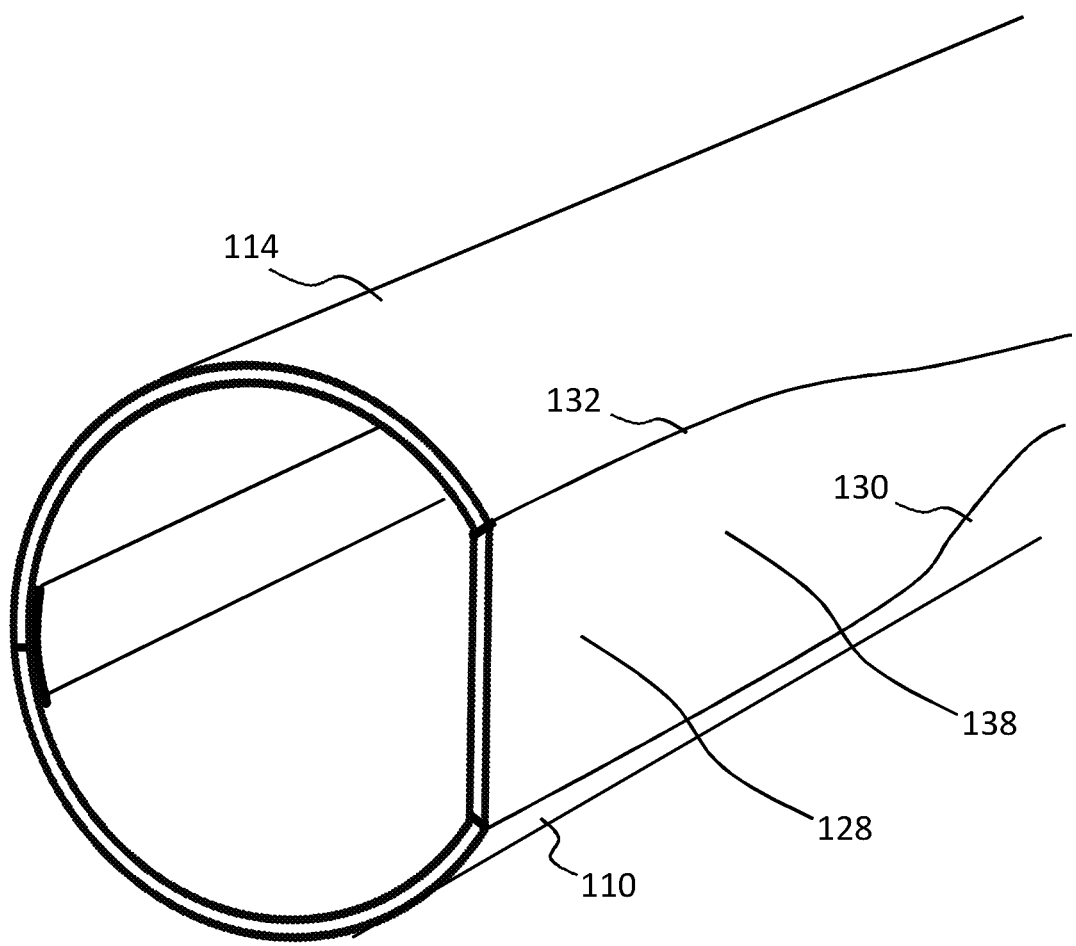
Figure 8:
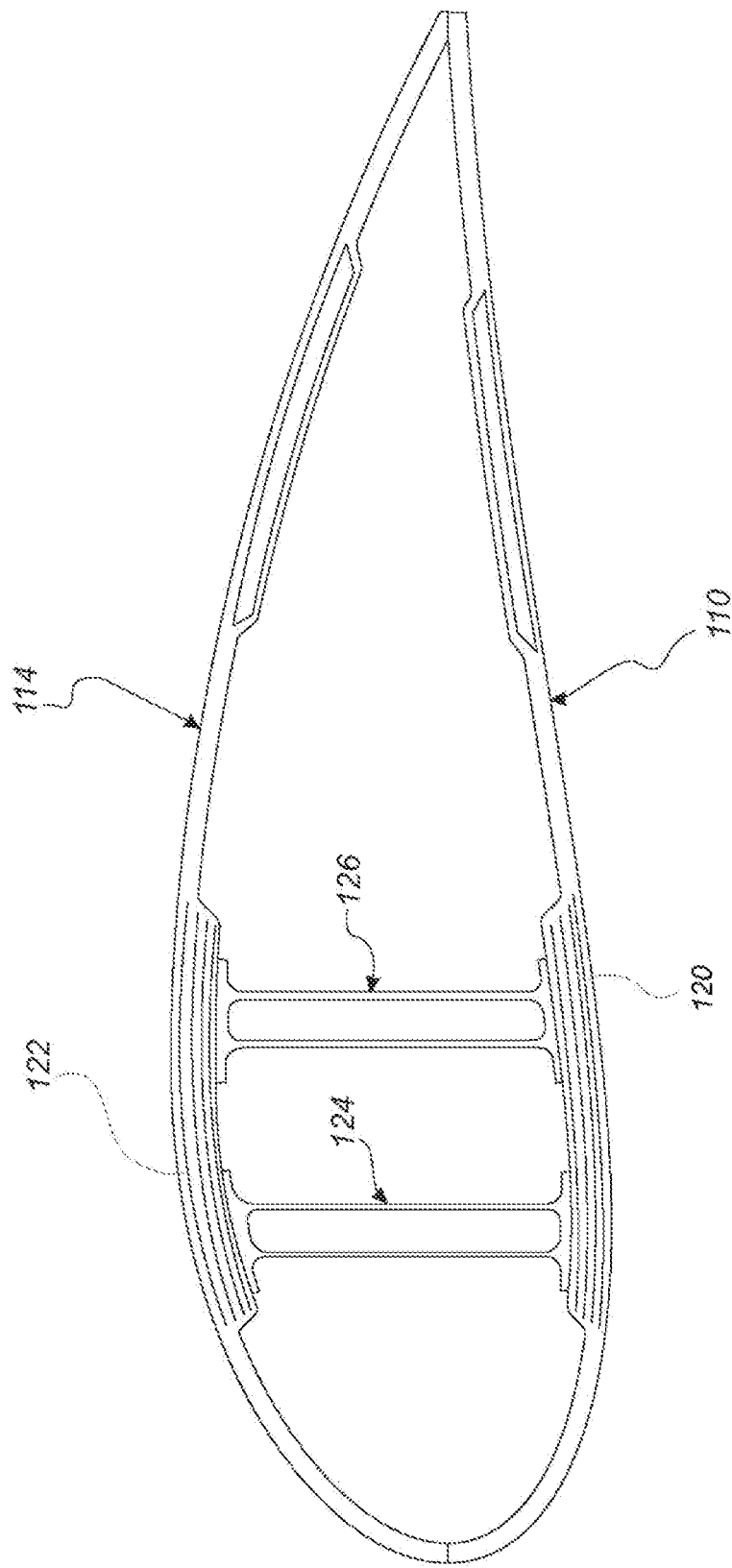

The invention is explained in detail below with reference to the drawings, in which FIG. 1 shows a wind turbine,
FIG. 2 shows a schematic view of a wind turbine blade,
FIG. 3 shows a schematic view of an airfoil profile,
FIG. 4 shows a schematic view of a wind turbine blade, seen from above and from the side, and
FIG. 5 shows a cross-section of an exemplary wind turbine blade according to the invention,
FIG. 6 shows a cross-section of an exemplary wind turbine blade according to the invention,
FIG. 7 shows a perspective cutaway view of a part of an exemplary wind turbine blade and
FIG. 8 shows a side view in section of the exemplary wind turbine blade.

The present invention relates to manufacture of blade shell parts of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of an exemplary wind turbine blade 10. The wind turbine blade 10 has the shape of a conventional wind turbine blade with a root end and a tip end and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell comprising two blade shell parts made of fibre-reinforced polymer and is typically made as a pressure side or upwind blade shell part 24 and a suction side or downwind blade shell part 26 that are glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

FIGS. 3 and 4 depict parameters, which may be used to explain the geometry of blade shell parts to be manufactured according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade and blade shell parts. The blade and blade shell parts have a total blade length L. As shown in FIG. 3, the root end is located at position r=0, and the tip end located at r=L. The shoulder 40 of the blade shell parts is located at a position $r=L_w$, and has a shoulder width W, which equals the chord length at the shoulder 40. The diameter of the root is defined as X. Further, the blade/blade shell parts is provided with a prebend, which is defined as Δy, which corresponds to the out of plane deflection from a pitch axis 22 of the blade.

FIG. 5 shows a cross-section in the root region of an exemplary wind turbine blade, the cross-section being perpendicular to the longitudinal axis at a distance along the longitudinal axis, such as at a distance less than 5 m from the root end, such as at the root end. The wind turbine blade 100 comprises a profiled contour 102 with a leading edge 104 and a trailing edge 106 and a chord 108 extending between the leading edge and the trailing edge. The wind turbine blade comprises a first blade shell part 110 with a pressure side 112 and a second blade shell part 114 with a suction side 116, the first and second blade shell parts extending from the root end to the tip end and joined along a primary glue joint 118 at the leading edge 104. As shown in FIG. 8, the wind turbine blade 100 comprises a first main spar cap 120 integrated in the first blade shell part 110, a second main spar cap 122 integrated in the second blade shell part 114, and a primary shear web 124 and a secondary shear web 126 connected between the first main spar cap 120 and the second main spar cap 122.

The wind turbine blade 100 comprises a third blade shell part 128 extending from the root end of the wind turbine blade and forming at least a part of the trailing edge. The third blade shell part 128 is joined to the first blade shell 110 part along a first secondary glue joint 130 and to the second blade shell part 114 along a second secondary glue joint 132.

The outer surface of the third blade shell part 128 forms or comprises a straight line segment 134 forming a flatback section at the trailing edge 106. The straight line segment 134 has a length LS of at least 0.3*t, where t is the maximum thickness of the wind turbine blade in the cross-section. In the illustrated cross-section, LS=0.5*t. The outer surface of the third blade shell part 128 may form and/or comprise a concave line segment. In one or more exemplary wind turbine blades, LS is about 1.7 m, e.g. at a distance of 2 m and/or at a distance of 3 m and/or at a distance of 6.5 m from the root end. In one or more exemplary wind turbine blades, LS>1.7 m, e.g. at a distance of 2 m and/or at a distance of 3 m and/or at a distance of 6.5 m from the root end.

A first axis X1 is perpendicular to the pitch axis 136 and crosses the first secondary glue joint 130 and the pitch axis 136. A first angle V1 between the first axis X1 and reference axis R is 32 degrees. The reference axis R is perpendicular to the pitch axis 136 and crosses the leading edge 104 and the pitch axis 136. A second axis X2 is perpendicular to the pitch axis 136 and crosses the second secondary glue joint 132 and the pitch axis 136. A second angle V2 between the second axis X2 and the reference axis R is 32. The angle V3 between the first axis X1 and the second axis X2 is 64 degrees. In one or more exemplary wind turbine blades, V1 may be 65 degrees, and/or V2 may be 0 degrees, e.g. at a distance of 2 m from the root end. In one or more exemplary wind turbine blades, V3 may be larger than 60 degrees, e.g. at a distance of 2 m and/or at a distance of 3 m from the root end.

FIG. 6 shows a cross-section in the root region of an exemplary wind turbine blade, the cross-section being perpendicular to the longitudinal axis at a distance along the longitudinal axis, such as at a distance less than 5 m from the root end, such as at the root end.

The first angle V1 between the first axis X1 and reference axis R is 48 degrees. The reference axis R is perpendicular to the pitch axis 136 and crosses the leading edge 104 and the pitch axis 136. The first axis X1 is perpendicular to the pitch axis 136 and crosses the first secondary glue joint 130 and the pitch axis 136.

A second angle V2 between the second axis X2 and the reference axis R is 49 degrees. The second axis X2 is perpendicular to the pitch axis 136 and crosses the second secondary glue joint 132 and the pitch axis 136. The angle V3 between the first axis X1 and the second axis X2 is 97 degrees.

FIG. 7 shows a perspective cutaway view of a part of an exemplary wind turbine blade. The wind turbine blade 100 comprises a flatback section 138 at the trailing edge of the wind turbine blade. The flatback section 138 is formed in the third blade shell part 128 between the first secondary glue joint 130 and the second secondary glue joint 132.

The flatback section 138 extends from a first flatback distance D1 from the root end along the longitudinal axis to a second flatback distance D2 from the root end. In the illustrated wind turbine blade, the flatback section starts at a first flatback distance less than 2 m, e.g. less than 1 m, from the root end, such as at the root end, and ends at a second flatback distance larger than 0.3*L, where L is the blade length. The first secondary glue joint 130 and the second secondary glue joint 132 merge into a secondary glue joint at a merging distance from the root end. The merging distance may be larger than the second flatback distance. The merging distance may be larger than 0.3*L, where L is the blade length of the wind turbine blade.

The invention has been described with reference to preferred embodiments. However, the scope of the invention is not limited to the illustrated embodiments, and alterations and modifications can be carried out without deviating from the scope of the invention that is defined by the following claims. The invention is not limited to the embodiments described herein, and may be modified or adapted without departing from the scope of the present invention.

LIST OF REFERENCE NUMERALS 2 wind turbine
4 tower
6 nacelle
8 hub
10 blade
14 blade tip
15 tip end section
16 blade root
17 root end face
18 leading edge
20 trailing edge
22 pitch axis
24 pressure side blade shell part/upwind blade shell part
26 suction side blade shell part/downwind blade shell part
28 bond lines/glue joints
29 horizontal
30 root region
32 transition region
34 airfoil region
50 airfoil profile
52 pressure side/upwind side
54 suction side/downwind side
56 leading edge
58 trailing edge
60 chord
62 camber line/median line
100 wind turbine blade
102 profiled contour
104 leading edge
106 trailing edge
108 chord
110 first blade shell part
112 pressure side
114 second blade shell part
116 suction side
118 primary glue joint
120 first main spar cap
122 second main spar cap
124 primary shear web
126 secondary shear web
128 third blade shell part
130 first secondary glue joint
132 second secondary glue joint
134 straight line segment
136 pitch axis
138 flatback section
c chord length
$d_t$ position of maximum thickness
$d_f$ position of maximum camber
$d_p$ position of maximum pressure side camber
f camber
$l_f$ longitudinal distance between root end frames
$l_o$ longitudinal extent of blade tip overhang
L blade length
r local radius, radial distance from blade root
t thickness
D blade root diameter
Δy prebend
X longitudinal axis
X1 first axis
X2 second axis
R reference axis
V1 first angle
V2 second angle
V3 angle between first axis and second axis
D1 first flatback distance
D2 second flatback distance
Dm merging distance
LS length of straight line segment
LF length of flatback section

The invention claimed is:

1. A wind turbine blade extending from a root end to a tip end along a longitudinal axis and comprising a root region, a transition region, and an airfoil region, the wind turbine blade comprising:
a profiled contour with a leading edge and a trailing edge and a chord extending between the leading edge and the trailing edge;
a blade shell with a first blade shell part with a pressure side and a second blade shell part with a suction side, the first and second blade shell parts extending from the root end to the tip end and joined along a primary glue joint;
a first main spar cap integrated in the first blade shell part;
a second main spar cap integrated in the second blade shell part; and
one or more shear webs connected between the first main spar cap and the second main spar cap,
wherein the blade shell comprises a third blade shell part extending from a root end face of the wind turbine blade, and wherein the third blade shell part is joined to the first blade shell part along a first secondary glue joint and to the second blade shell part along a second secondary glue joint.

2. The wind turbine blade according to claim 1, wherein the third blade shell part forms at least 1% of the circumference of the wind turbine blade shell at the root end.

3. The wind turbine blade according to claim 1, wherein the third blade shell part extends into the transition region.

4. The wind turbine blade according to claim 1, wherein the first secondary glue joint and the second secondary glue joint merge into a secondary glue joint at a merging distance from the root end.

5. The wind turbine blade according to claim 1, wherein an outer surface of the third blade shell part in a first cross section perpendicular to the longitudinal axis forms a straight line segment forming a flatback section at the trailing edge.

6. The wind turbine blade according to claim 1, wherein the blade shell comprises a flatback section at the trailing edge, the flatback section extending from a first flatback distance from the root end along the longitudinal axis to a second flatback distance from the root end, wherein the first flatback distance is less than 2 m.

7. The wind turbine blade according to claim 6, wherein the flatback section has a length in the range from 0.01*L to 0.70*L, where L is a blade length of the wind turbine blade.

8. The wind turbine blade according to claim 6, wherein the flatback section has a maximum height in the range from 0.30*t to t, where t is a maximum thickness of the wind turbine blade in the respective cross-section with the maximum height of the flatback section.

9. The wind turbine blade according to claim 1, wherein the third blade shell part forms at least a part of the trailing edge of the wind turbine blade.

10. The wind turbine blade according to claim 1, wherein the primary glue joint is at the leading edge.

11. The wind turbine blade according claim 1, wherein a first axis is perpendicular to a pitch axis and crosses the first secondary glue joint and the pitch axis, a reference axis is perpendicular to the pitch axis and crossing the leading edge and the pitch axis, and wherein a first angle between the first axis and reference axis is larger than 15 degrees.

12. The wind turbine blade according to claim 11, wherein a second axis is perpendicular to the pitch axis and crosses the second secondary glue joint and the pitch axis, the reference axis is perpendicular to the pitch axis and crossing the leading edge and the pitch axis, and wherein a second angle between the reference axis and the second axis is larger than 15 degrees.

13. The wind turbine blade according to claim 12, wherein an angle between the first axis and the second axis is larger than 20 degrees.

14. A method of manufacturing a wind turbine blade extending from a root end to a tip end along a longitudinal axis and comprising a root region, a transition region, and an airfoil region, the wind turbine blade comprising a profiled contour with a leading edge and a trailing edge and a chord extending between the leading edge and the trailing edge, a blade shell with a pressure side and a suction side, a first main spar cap integrated in the pressure side of the blade shell, a second main spar cap integrated in the suction side of the blade shell, and one or more shear webs connected between the first main spar cap and the second main spar cap, the method comprising:

providing a first blade shell part and a second blade shell part each extending from the root end to the tip end;
  providing a third blade shell part;
  joining the first blade shell part and the second blade shell part along a primary glue joint;
  joining the first blade shell part and the third blade shell part along a first secondary glue joint; and
  joining the second blade shell part and the third blade shell part along a second secondary glue joint,
  wherein the third blade shell part extends from a root end face of the wind turbine blade.

15. The method according to claim 14, wherein providing the third blade shell part comprises forming a flatback section in the third blade shell part.

* * * * *